US008018700B2

(12) United States Patent
Nerone

(10) Patent No.: US 8,018,700 B2
(45) Date of Patent: Sep. 13, 2011

(54) RISK OF SHOCK PROTECTION CIRCUIT

(75) Inventor: Louis Robert Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 756 days.

(21) Appl. No.: 12/141,444

(22) Filed: Jun. 18, 2008

(65) Prior Publication Data

US 2009/0059448 A1   Mar. 5, 2009

Related U.S. Application Data

(60) Provisional application No. 60/968,219, filed on Aug. 27, 2007.

(51) Int. Cl.
*H02H 3/20* (2006.01)
*H02H 9/04* (2006.01)
*H05B 41/36* (2006.01)

(52) U.S. Cl. ........................................ 361/91.1; 315/307
(58) Field of Classification Search .................. 361/91.1
See application file for complete search history.

(56) References Cited

U.S. PATENT DOCUMENTS

| 4,276,496 | A | 6/1981 | Arena-Ochoa | |
| 4,926,096 | A | 5/1990 | Nilssen | |
| 7,733,036 | B2 * | 6/2010 | Buij | 315/307 |
| 7,876,060 | B2 * | 1/2011 | Alexandrov | 315/307 |
| 2005/0168161 | A1 | 8/2005 | Chiou | |
| 2005/0218829 | A1 | 10/2005 | Yadlapalli | |
| 2006/0006816 | A1 * | 1/2006 | Alexandrov | 315/291 |

OTHER PUBLICATIONS

PCT/US2008/068256 International Search Report, mailed Dec. 8, 2008.

* cited by examiner

*Primary Examiner* — Dharti Patel
(74) *Attorney, Agent, or Firm* — Fay Sharpe LLP

(57) ABSTRACT

A risk of shock (ROS) protection circuit is disclosed, which comprises a capacitor that charges whenever there is a voltage between a ground on a lamp ballast and earth ground. If the capacitor exceeds a predetermined threshold voltage, the capacitor causes a gate to shunt current away from a tertiary winding in a control circuit, which in turn reduces impedance reflected by the tertiary winding back on to primary and secondary windings in the ballast circuit. The reduced reflected impedance causes the operating frequency of the ballast to increase, reducing the voltage between the ballast ground and earth ground until it is safe for human contact. In this manner, a human replacing a lamp connected to the ballast can be protected from shock despite a failure to disconnect the power to the lamp ballast prior to lamp replacement.

20 Claims, 4 Drawing Sheets

RISK OF SHOCK PROTECTION CIRCUIT

BACKGROUND OF THE INVENTION

This application claims the benefit of provisional patent application Ser. No. 60/968,219, filed Aug. 27, 2007, which is incorporated by reference in its entirety herein.

BACKGROUND OF THE INVENTION

The present application is directed to electronic ballasts. It finds particular application in conjunction with the resonant inverter circuits that operate one or more fluorescent lamps and will be described with the particular reference thereto. However, it is to be appreciated that the following is also amenable to high intensity discharge (HID) lamps and the like.

A ballast is an electrical device which is used to provide power to a load, such as an electrical lamp, and to regulate the current provided to the load. The ballast provides high voltage to start a lamp by ionizing sufficient plasma (vapor) for the arc to be sustained and to grow. Once the arc is established, the ballast allows the lamp to continue to operate by providing proper controlled current flow to the lamp.

Typically, after the alternating current (AC) voltage from the power source is rectified and appropriately conditioned, the inverter converts the DC voltage to AC. The inverter typically includes a pair of serially connected switches, such as MOSFETs which are controlled by the drive gate control circuitry to be "ON" or "OFF."

Linear fluorescent lamp ballasts are required to meet a UL safety standard which calls for the quantification of the Risk of Shock (ROS). To meet such standards, the current that may flow through a human body model (HBM) when one end of a linear fluorescent lamp (LFL) is removed from its socket is measured, and is required to be less than the limit prescribed by UL. Inverters of the type described above typically do not have transformer isolation and are capable of producing ROS currents that may exceed the UL safety requirement. When such lamps need replacing, power to the lamps should be removed, in order to make changing the lamps safe for a human carrying out the replacement procedure. However, in practice, the step of cutting the power is often omitted. Even more dangerous is that workers often use their fingers to line up the pins on the lamp with the sockets in the lamp housing. If any other part of the worker is in contact with earth ground, then the workers body completes a circuit and the worker suffers a potentially lethal shock when high-frequency (e.g., 70 kHz-150 kHz or so) current pulses through the worker.

The following contemplates new methods and apparatuses that overcome the above referenced problems and others.

BRIEF DESCRIPTION OF THE INVENTION

According to an aspect, a risk-of-shock (ROS) protection system for a lamp comprises a ROS sensor circuit with a capacitor that charges when there is a voltage between earth ground and a ballast ground, a ballast circuit that is connected to one or more lamps and to the ballast ground, and a control circuit coupled to the ballast circuit and to the ROS circuit, wherein when the capacitor charges to a voltage that exceeds a predetermined threshold voltage level, the voltage between earth ground and the ballast ground is reduced.

According to another aspect, a ballast circuit for reducing the risk of shock to a human comprises an inverter circuit with primary and secondary inductor windings around a ferrite core, a resonant circuit, coupled to the inverter circuit and to at least one lamp, a control circuit that is hardwired to the inverter circuit and the resonant circuit and comprises a tertiary winding around the ferrite core to inductively couple the control circuit to the inverter circuit, and a ROS sensor circuit, hardwired to the control circuit, with a capacitor that charges when there is a voltage between a ground on the resonant circuit of the ballast and earth ground.

According to yet another aspect, a risk of shock protection circuit comprises a first diode with a cathode connected to a control circuit for a lamp ballast, and an anode connected to a first resistor and a first capacitor, a second diode with a cathode connected to the anode of the first diode, the first capacitor, and the first resistor, and an anode connected to a second capacitor, and a third diode with a cathode connected to the anode of the second diode and the second capacitor, and an anode connected to the first capacitor, the first resistor, and ground. The circuit further includes a second resistor that is coupled to the second capacitor and to earth ground, wherein the first resistor, the first capacitor, and the third diode are connected in parallel relative to each other.

DETAILED DESCRIPTION OF THE INVENTION

Figure 1:
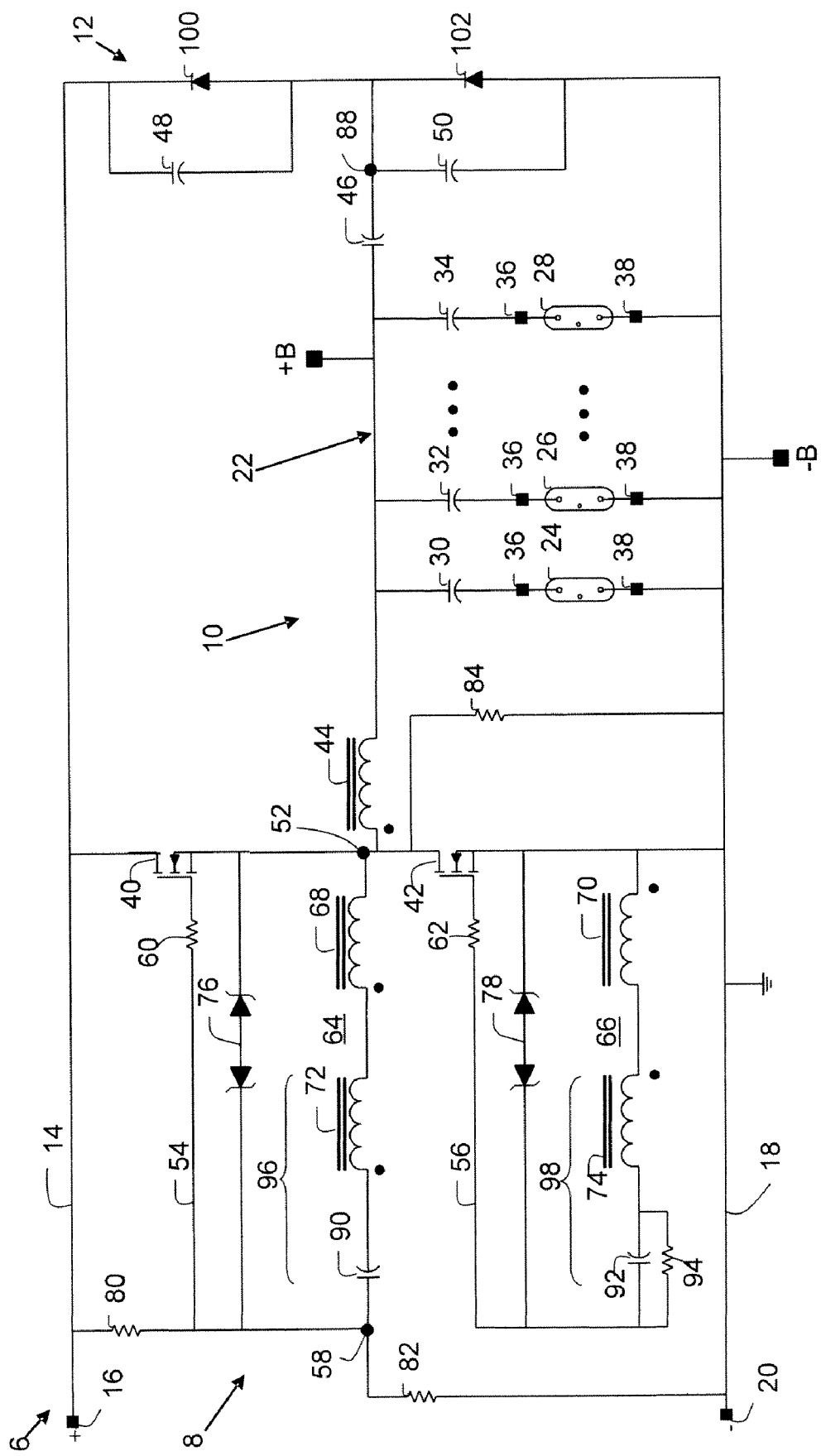
FIG. 1 is a diagrammatic illustration of a ballast circuit that includes a plurality of components for detecting whether a risk of shock (ROS) is present, and if so, folding back an inverter voltage to a safe level to prevent harm to a human.

With reference to FIG. 1, a ballast circuit 6 includes a plurality of components that facilitate determining whether a risk of shock (ROS) is present, and if so, folding back an inverter voltage to a safe level to prevent harm to a human. The ballast is coupled to one or more lamps 24, 26, . . . , 28, such as linear fluorescent lamps or the like. The ballast circuit 6 can be employed with an ROS circuit (FIG. 4) to ensure that an ROS condition is mitigated when a user is replacing a lamp and fails to cut power to the lamp during the replacement procedure.

The ballast circuit 6 includes an inverter circuit 8, a resonant circuit or network 10, and a clamping circuit 12. A DC voltage is supplied to the inverter 8 via a voltage conductor 14 running from a positive voltage terminal 16 and a common conductor 18 connected to a ground or common terminal 20. A high frequency bus 22 is generated by the resonant circuit 10 as described in more detail below. Additionally, the high-frequency bus 22 is connected to a node labeled "+B," which in turn is connected to a controller circuit 108, described in greater detail below. First, second, . . . , nth lamps 24, 26, . . . , 28 are coupled to the high frequency bus via first, second, . . . , nth ballasting capacitors 30, 32, . . . , 34. Thus if one lamp is removed, the others continue to operate. It is contemplated that any number of lamps can be connected to the high frequency bus 22. E.g., each lamp 24, 26, . . . , 28 is coupled to the high frequency bus 22 via an associated ballasting capacitor 30, 32, . . . , 34. Power to each lamp 24, 26, . . . , 28 is supplied via respective lamp connectors 36, 38.

The inverter 8 includes analogous upper and lower or first and second switches 40 and 42, for example, two n-channel MOSFET devices (as shown), serially connected between conductors 14 and 18, to excite the resonant circuit 10. Two P-channel MOSFETs may also be configured. The high frequency bus 22 is generated by the inverter 8 and the resonant circuit 10 and includes a resonant inductor 44 and an equivalent resonant capacitance which includes the equivalence of first, second and third capacitors 46, 48, 50, and ballasting capacitors 30, 32, ..., 34 which also prevent DC current flowing through the lamps 24, 26, ..., 28. The ballasting capacitors 30, 32, ..., 34 are primarily used as ballasting capacitors.

The switches 40 and 42 cooperate to provide a square wave at a common or first node 52 to excite the resonant circuit 10. Gate or control lines 54 and 56, running from the switches 40 and 42 are connected at a control or second node 58. Each control line 54, 56 includes a respective resistance 60, 62.

With continuing reference to FIG. 1, first and second gate drive circuitry or circuit, generally designated 64, 66, is connected between the nodes 52, 58 and includes first and second driving inductors 68, 70 which are secondary windings mutually coupled to the resonant inductor 44 to induce in the driving inductors 68, 70 voltage proportional to the instantaneous rate of change of current in the resonant circuit 10. First and second secondary inductors 72, 74 are serially connected to the respective first and second driving inductors 68, 70 and the gate control lines 54 and 56.

The gate drive circuitry 64, 66 is used to control the operation of the respective upper and lower switches 40 and 42. More particularly, the gate drive circuitry 64, 66 maintains the upper switch 40 "ON" for a first half of a cycle and the lower switch 42 "ON" for a second half of the cycle. The square wave is generated at the node 52 and is used to excite the resonant circuit 10. First and second bi-directional voltage clamps 76, 78 are connected in parallel to the secondary inductors 72, 74 respectively each including a pair of back-to-back Zener diodes. The bi-directional voltage clamps 76, 78 act to clamp positive and negative excursions of gate-to-source voltage to respective limits determined by the voltage ratings of the back-to-back Zener diodes. Each bi-directional voltage clamp 76, 78 cooperates with the respective first or second secondary inductor 72, 74 so that the phase angle between the fundamental frequency component of voltage across the resonant circuit 10 and the AC current in the resonant inductor 44 approaches zero during ignition of the lamps.

Serially connected resistors 80, 82 cooperate with a resistor 84, connected between the common node 52 and the common conductor 18, for starting regenerative operation of the gate drive circuits 64, 66. Upper and lower capacitors 90, 92 are connected in series with the respective first and second secondary inductors 72, 74. In the starting process, the capacitor 90 is charged from the voltage terminal 16 via the resistors 80, 82, 84. A resistor 94 shunts the capacitor 92 to prevent the capacitor 92 from charging. This prevents the switches 40 and 42 from turning ON, initially, at the same time. The voltage across the capacitor 90 is initially zero, and, during the starting process, the serially-connected inductors 68 and 72 act essentially as a short circuit, due to a relatively long time constant for charging of the capacitor 90. When the capacitor 90 is charged to the threshold voltage of the gate-to-source voltage of the switch 40, (e.g., 2-3 volts), the switch 40 turns ON, which results in a small bias current flowing through the switch 40. The resulting current biases the switch 40 in a common drain, Class A amplifier configuration. This produces an amplifier of sufficient gain such that the combination of the resonant circuit 10 and the gate control circuit 64 produces a regenerative action which starts the inverter into oscillation, near the resonant frequency of the network including the capacitor 90 and inductor 72. The generated frequency is above the resonant frequency of the resonant circuit 10, which allows the inverter 8 to operative above the resonant frequency of the resonant network 10. This produces a resonant current which lags the fundamental of the voltage produced at the common node 52, allowing the inverter 8 to operate in the soft-switching mode prior to igniting the lamps. Thus, the inverter 8 starts operating in the linear mode and transitions into the switching Class D mode. Then, as the current builds up through the resonant circuit 10, the voltage of the high frequency bus 22 increases to ignite the lamps, while maintaining the soft-switching mode, through ignition and into the conducting, arc mode of the lamps.

During steady state operation of the ballast circuit 6, the voltage at the common node 52, being a square wave, is approximately one-half of the voltage of the positive terminal 16. The bias voltage that once existed on the capacitor 90 diminishes. The frequency of operation is such that a first network 96 including the capacitor 90 and inductor 72 and a second network 98 including the capacitor 92 and inductor 74 are equivalently inductive. That is, the frequency of operation is above the resonant frequency of the identical first and second networks 96, 98. This results in the proper phase shift of the gate circuit to allow the current flowing through the inductor 44 to lag the fundamental frequency of the voltage produced at the common node 52. Thus, soft-switching of the inverter 8 is maintained during the steady-state operation.

With continuing reference to FIG. 1, the output voltage of the inverter 8 is clamped by serially connected clamping diodes 100, 102 of the clamping circuit 12 to limit high voltage generated to start the lamps 24, 26 . . . , 28. The clamping circuit 12 further includes the second and third capacitors 48, 50, which are essentially connected in parallel to each other. Each clamping diode 100, 102 is connected across an associated second or third capacitor 48, 50. Prior to the lamps starting, the lamps' circuits are open, since impedance of each lamp 24, 26, . . . , 28 is seen as very high impedance. The resonant circuit 10 is composed of the capacitors 30, 32, . . . , 34, 46, 48, 50 and the resonant inductor 44 and is driven near resonance. As the output voltage at the common node 52 increases, the clamping diodes 100, 102 start to clamp, preventing the voltage across the second and third capacitors 48, 50 from changing sign and limiting the output voltage to the value that does not cause overheating of the inverter 8 components. When the clamping diodes 100, 102 are clamping the second and third capacitors 48, 50, the resonant circuit 10 becomes composed of the capacitors 30, 32, . . . , 34, 46 and the resonant inductor 44. E.g., the resonance is achieved when the clamping diodes 100, 102 are not conducting. When the lamps ignite, the impedance decreases quickly. The voltage at the common node 52 decreases accordingly. The clamping diodes 100, 102 discontinue clamping the second and third capacitors 48, 50 and the ballast 6 enters steady state operation. The resonance is dictated again by the capacitors 30, 32, . . . , 34, 46, 48, 50 and the resonant inductor 44.

Figure 2:
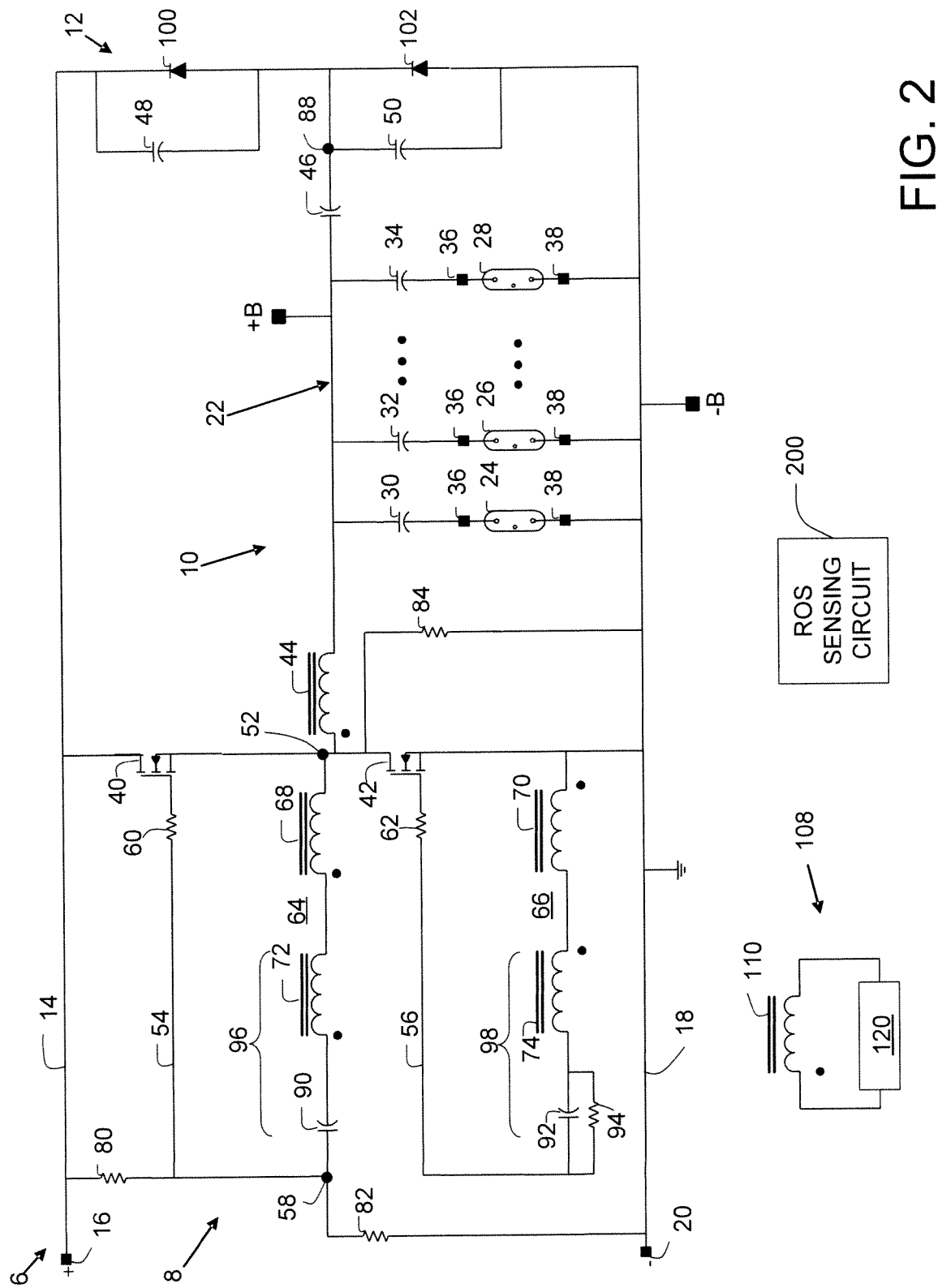
FIG. 2 is an illustration of the ballast circuit and a corresponding control circuit coupled thereto, as well as a ROS protection circuit that detects wither a current level exceeds an acceptable ROS threshold level and folds back voltage supplied to an inverter to mitigate an ROS condition, if present.
Figure 3:
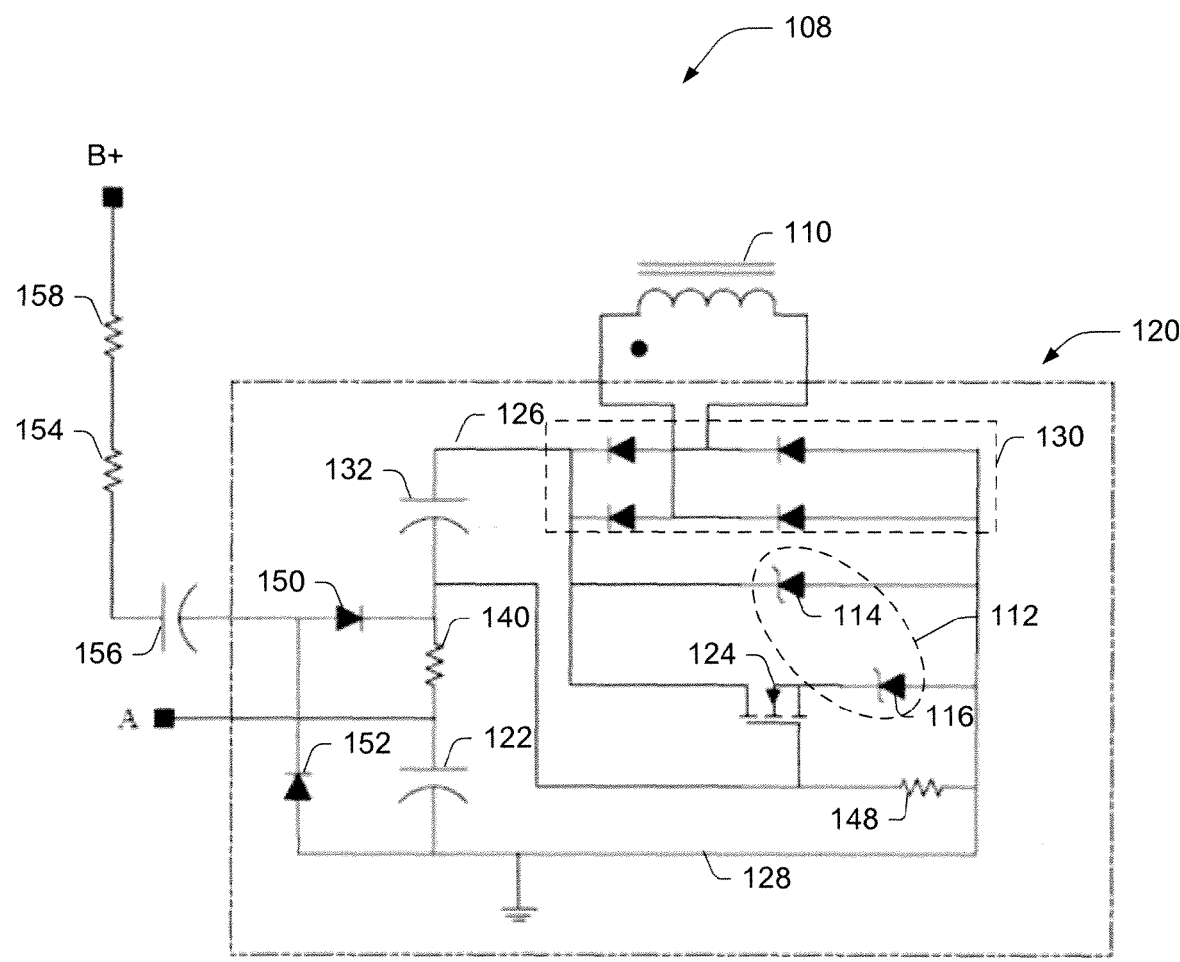
FIG. 3 is an illustration of a more detailed diagram of the control circuit.

In the manner described above, the inverter 8 provides a high frequency bus at the common node 52 while maintaining the soft switching condition for switches 40, 42. The inverter 8 is able start a single lamp when the rest of the lamps are lit because there is sufficient voltage at the high frequency bus to allow for ignition With reference to FIGS. 2 and 3, a tertiary circuit 108 is coupled to the inverter circuit 8. More specifically, a tertiary winding or inductor 110 is mutually coupled to the first and second secondary inductors 72, 74, and the circuit 108 is hardwired to the ballast circuit 6 via node +B. The resonant circuit 10 also includes a node −B, which may be considered a ground. In this embodiment, the first and second bi-directional voltage clamps 76, 78 are optionally omitted. An auxiliary or third voltage clamp 112, which includes first and second Zener diodes 114, 116, is connected in parallel to the tertiary inductor 110. Because the tertiary inductor 110 is mutually coupled to the first and second secondary inductors 72, 74, the auxiliary voltage clamp 112 simultaneously clamps the first and second gate circuits 64, 66.

Different values of the Zener diodes 114, 116 of the voltage clamp 112 are useful in allowing the ballast 6 to change the current and subsequently the power provided to the lamps 24, 26, . . . , 28. As is known, in an instant-start ballast, the initial mode of the lamp operation is glow. In the glow mode, the voltage across the lamp electrodes is high, for example, 300V. The current that flows in the lamp is typically lower than the running current, for example, 40 or 50 mA instead of 180 mA. The electrodes heat up and become thermionic. Once the electrodes become thermionic, the electrodes emit electrons into the plasma and the lamp ignites. Once the lamp ignites, the different amount of power is to be delivered to the each of the ballasts since each ballast runs at a nominal current different level of a nominal current.

For example, during ignition of the lamps 24, 26, . . . , 28, the clamping voltage of the tertiary winding 110 is increased to allow more glow power. After the lamps have started, the voltage can be folded back to allow the correct steady-state current to flow. This function can be implemented via a controller 120.

More specifically, prior to ignition, a capacitor 122 is discharged, causing a switch 124, such as a MOSFET, to be in the "OFF" state. When the inverter 8 starts to oscillate, the capacitor 122 charges via lines 126 and 128. The tertiary winding 110 is clamped by parallel-connected first and second Zener diodes 114, 116 that are coupled to the drain and source of the MOSFET 124. When a high-power start mode is employed in the controller 120, a high-frequency of the input signal causes the capacitor 122 to charge, which causes Zener diode 116 to turn on, which in turn causes MOSFET 124 to turn ON and the control circuit to start regulating. That is, once the capacitor 122 charges to a predefined voltage, such as the threshold voltage of the MOSFET 124, the MOSFET 124 turns ON and current is shunted away from the second Zener diode 116 that is connected to the source terminal of the MOSFET 124. The capacitor 122 is connected in series with a resistor 140, and a capacitor 132 is connected to the gate and drain of the MOSFET 124. A diode 150 is connected in parallel to the resistor 140 and capacitor 122. Thus, the higher voltage clamping of the tertiary winding 110 allows more glow power to be achieved until the lamps 24, 26, . . . , 28 start. A resistor 148 is coupled to the gate of the MOSFET 124 and to the anode of the Zener diode 116. The circuit 108 further includes a diode 152, a resistor 154, a capacitor 156, and a resistor 158, which is connected to node +B (e.g., the tie-in point to high-frequency bus 22 of the ballast circuit 6).

After a period of time, such as for example from about 0.5 to about 1.0 seconds, the MOSFET 124 turns ON, causing the tertiary winding 110 to be clamped at a lower voltage. This allows the lower steady-state lamp power to be achieved. Thus, the switching of the clamping voltage, such as the switching of the voltage clamping of the tertiary winding 110 via the Zener diodes 114, 116, causes an increase in the power applied to the lamps 24, 26, . . . , 28 during the glow stage but folds back this power to allow the lamps 24, 26, . . . , 28 to operate under normal predetermined power levels of the lamps 24, 26, . . . , 28. The circuit 108 additionally is coupled to a node "A," which is in turn coupled to the ROS circuit 200, described below with regard to FIG. 4.

In addition to the normal instant start function and the setting of various predetermined steady-state power limits, by controlling the tertiary winding 110, the ballast 6 can be used as a program start, rapid start ballast or instant start ballast in a variety of applications for different ballast factors.

Figure 4:
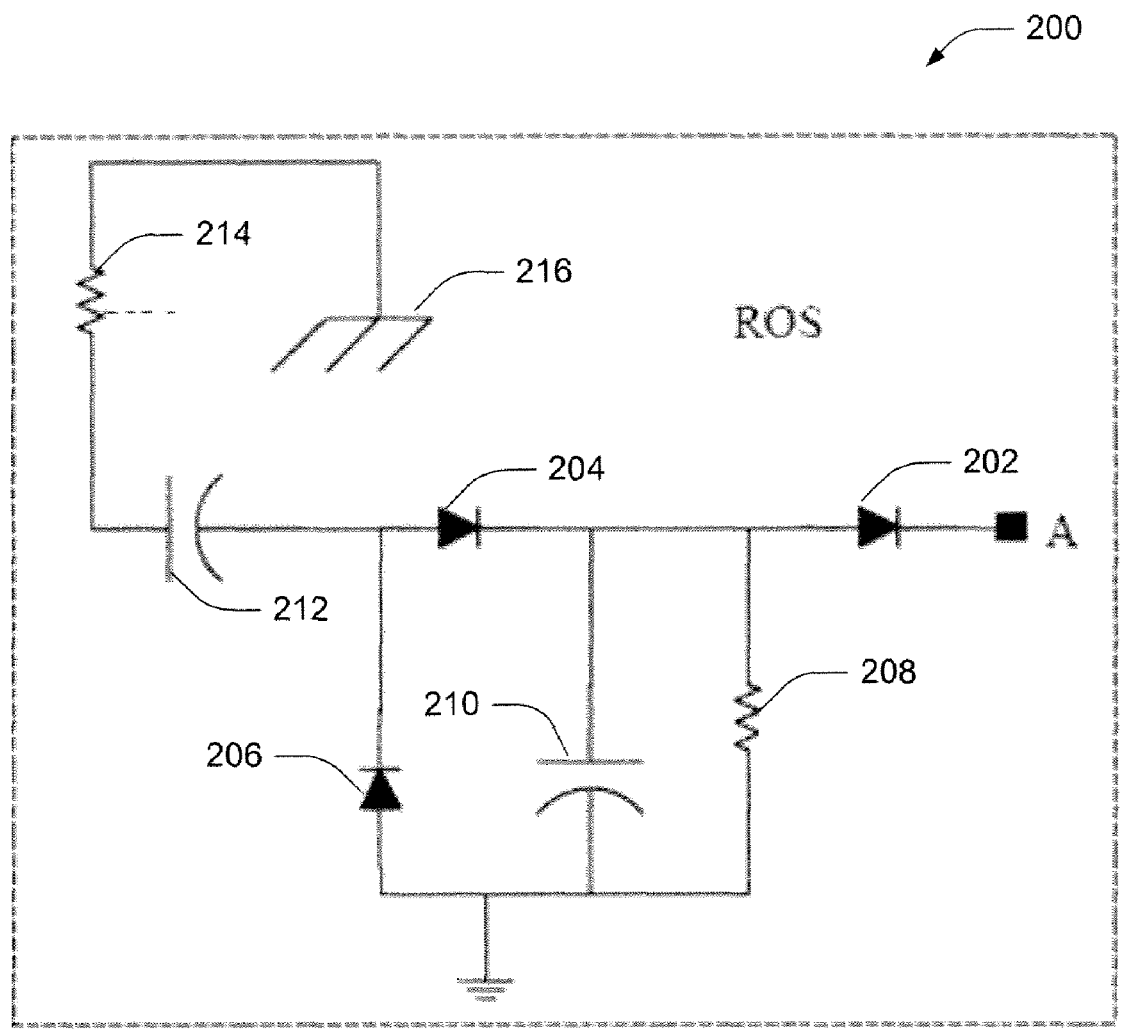
FIG. 4 is an illustration of the ROS circuit.

FIG. 4 is an illustration of the ROS protection circuit 200, which is coupled to control circuit 108 via node A. The ROS circuit 200 comprises a diode 202 that is connected to node A. Diode 202 is coupled in parallel to a diode 204, and to a resistor 208 and capacitor 210, which in turn are connected in parallel to each other. A diode 206 is also connected in parallel with capacitor 210 and resistor 208. Diode 204 and diode 206 are connected to a capacitor 212, which is in turn connected serially to a resistor 214. The resistor 214 is then serially connected to earth ground 216.

According to an example, the ROS protection circuit senses a potential between the ballast ground (e.g., node −B) and earth ground 216 in the ROS circuit 200. If a voltage is present, capacitor 210 charges. If the capacitor 210 exceeds a predetermined threshold voltage (e.g., approximately 8V, according to an example), then the potential voltage across node −B and earth ground is unacceptably high and poses a serious risk of injury. If such is the case, then the voltage a node A rises, and the MOSFET 124 increasingly shunts current away from winding 110, which lowers the impedance of winding 110, and consequently the impedance reflected back to windings 72 and 74 in the inverter circuit 8. This in turn increases the operating frequency of the inverter to rise, which causes the voltage across node −B and earth ground to decrease to a safe level. Thus, when capacitor 210 charges up, potential across the nodes −B and earth ground folds back.

It is to be appreciated that the foregoing example(s) is/are provided for illustrative purposes and that the subject innovation is not limited to the specific values or ranges of values presented therein. Rather, the subject innovation may employ or otherwise comprise any suitable values or ranges of values, as will be appreciated by those of skill in the art.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A risk-of-shock (ROS) protection system for a lamp, comprising:
    a ROS sensor circuit with a capacitor that charges when there is a voltage between earth ground and a ballast ground;
    a ballast circuit that is connected to one or more lamps and to the ballast ground; and
    a control circuit coupled to the ballast circuit and to the ROS sensor circuit;
    wherein when the capacitor charges to a voltage that exceeds a predetermined threshold voltage level, the voltage between earth ground and the ballast ground is reduced.

2. The system as set forth in claim 1, wherein the predetermined threshold voltage level is in the range of approximately 7V to approximately 9V.

3. The system as set forth in claim 2, wherein the predetermined threshold voltage level is approximately 8V.

4. The system as set forth in claim 2, further including a gate in the control circuit that shunts current away from a tertiary winding in the control circuit when the capacitor voltage exceeds the predetermined threshold.

5. The system as set forth in claim 4, wherein the tertiary winding is wound around a ferrite core of a coupling transformer, which couples the control circuit to the ballast circuit.

6. The system as set forth in claim 5, wherein the ballast circuit further comprises primary and secondary windings around the coupling transformer.

7. The system as set forth in claim 6, wherein the impedance of the tertiary winding is reduced as current is shunted away from the winding by the gate.

8. The system as set forth in claim 7, wherein the ballast circuit further comprises an inverter circuit, and wherein the operating frequency of the inverter circuit increases when the reduced impedance of the tertiary winding is reflected back to the primary and secondary windings.

9. The system as set forth in claim 8, wherein the voltage between earth ground and the ballast ground is reduced to a level safe for a human when the operating frequency of the inverter is increased.

10. The system as set forth in claim 4, wherein the gate is a MOSFET.

11. The system of claim 1, wherein the one or more lamps is a linear fluorescent lamp.

12. A ballast circuit for reducing the risk of shock to a human comprising:
    an inverter circuit with primary and secondary inductor windings around a ferrite core;
    a resonant circuit, coupled to the inverter circuit and to at least one lamp;
    a control circuit that is hardwired to the inverter circuit and the resonant circuit and comprises a tertiary winding around the ferrite core to inductively couple the control circuit to the inverter circuit; and
    a ROS sensor circuit, hardwired to the control circuit, with a capacitor that charges when there is a voltage between a ground on the resonant circuit of the ballast and earth ground.

13. The ballast as set forth in claim 12, further comprising a predetermined threshold voltage level that, when exceeded, causes the voltage in the ballast to fold back to a level safe for human contact.

14. The ballast as set forth in claim 13, wherein the capacitor exceeds the predetermined threshold level and causes a gate in the control circuit to reduce a current level to the tertiary winding.

15. The ballast as set forth in claim 14, wherein the reduced current to the tertiary winding causes the impedance reflected back to the primary and secondary windings to decrease.

16. The ballast as set forth in claim 15, wherein the operating frequency of the resonant circuit increases as a function of the decrease in impedance reflected back the primary and secondary windings.

17. The ballast as set forth in claim 16, wherein the increase in operating frequency reduces the voltage between the ballast ground and earth ground to a level safe for human contact.

18. A risk of shock protection circuit, comprising:
    a first diode with a cathode connected to a control circuit for a lamp ballast, and an anode connected to a first resistor and a first capacitor;
    a second diode with a cathode connected to the anode of the first diode, the first capacitor, and the first resistor, and an anode connected to a second capacitor;
    a third diode with a cathode connected to the anode of the second diode and the second capacitor, and an anode connected to the first capacitor, the first resistor, and ground; and
    a second resistor that is coupled to the second capacitor and to earth ground;
    wherein the first resistor, the first capacitor, and the third diode are connected in parallel relative to each other.

19. The ROS protection circuit of claim 18, wherein the first capacitor charges when there is a voltage potential between the earth ground and a ground on the lamp ballast.

20. The ROS protection circuit of claim 19, wherein the capacitor reaches a predetermined threshold voltage level at which a feedback loop of events is initiated to reduce the voltage potential between earth ground and the lamp ballast ground to a safe level for human contact.

* * * * *